(12) United States Patent
Neumann et al.

(10) Patent No.: US 6,264,553 B1
(45) Date of Patent: Jul. 24, 2001

(54) RASP BAR THRESHING ELEMENT AND ASSEMBLY

(75) Inventors: Corey Neumann, Geneseo; Edward N. A. Rahe, Downers Grove; John T. Sponzilli, Warrenville, all of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/375,088

(22) Filed: Aug. 16, 1999

(51) Int. Cl.[7] ................................................. A01F 12/20
(52) U.S. Cl. .................................................... 460/71
(58) Field of Search ................................. 460/71, 119

(56) References Cited

U.S. PATENT DOCUMENTS

| | | | |
|---|---|---|---|
| 4,043,844 | * 8/1977 | Feltz | 148/37 |
| 4,547,221 | * 10/1985 | Norman | 75/128 |
| 4,717,537 | * 1/1988 | Betz et al. | 420/129 |
| 4,889,517 | 12/1989 | Strong et al. | |
| 4,936,810 | 6/1990 | Strong et al. | |
| 4,946,419 | 8/1990 | Cromheecke et al. | |
| 5,035,675 | 7/1991 | Dunn et al. | |
| 5,125,871 | 6/1992 | Gorden | |
| 5,192,245 | 3/1993 | Francis et al. | |
| 5,192,246 | 3/1993 | Francis et al. | |
| 5,879,743 | * 3/1999 | Revanker | 427/191 |

OTHER PUBLICATIONS

Case Corporation Drawing No. 1309336C1, dated Mar. 21, 1982.
Case Corporation Drawing No. 1309175C1, dated Jun. 6, 1984.

* cited by examiner

Primary Examiner—Thomas B. Will
Assistant Examiner—Nathan Mammen
(74) Attorney, Agent, or Firm—Richard G. Lione; Brinks Hofer Gilson & Lione

(57) ABSTRACT

A threshing element for an axial flow combine comprising a chromium steel alloy rasp bar. The rasp bar is cast of chromium-moly white cast iron with an inclined front face with a slope of about 52.5°. The cast iron contains 18% to 23% chromium. The rasp bar walls are about 15 mm thick.

11 Claims, 4 Drawing Sheets

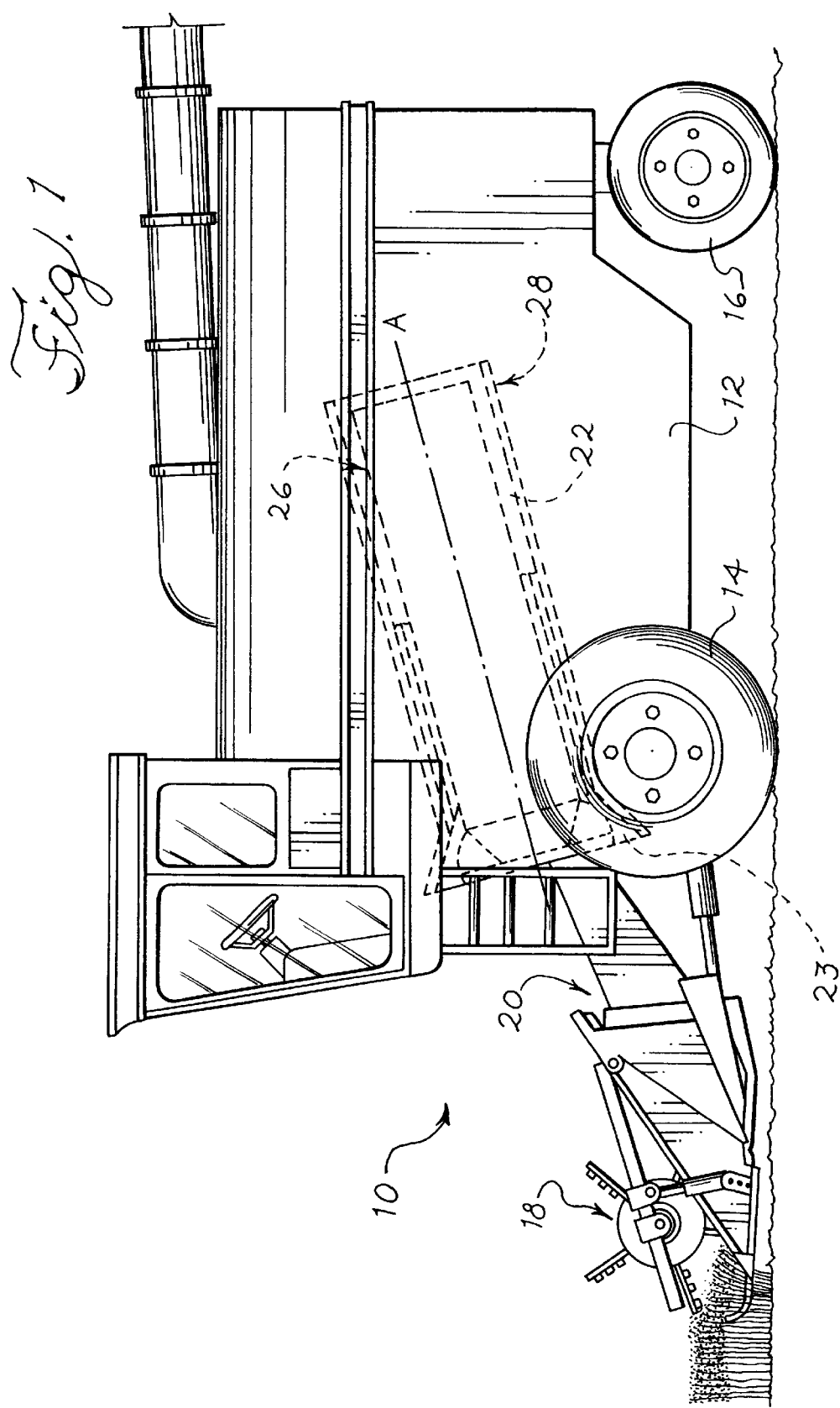

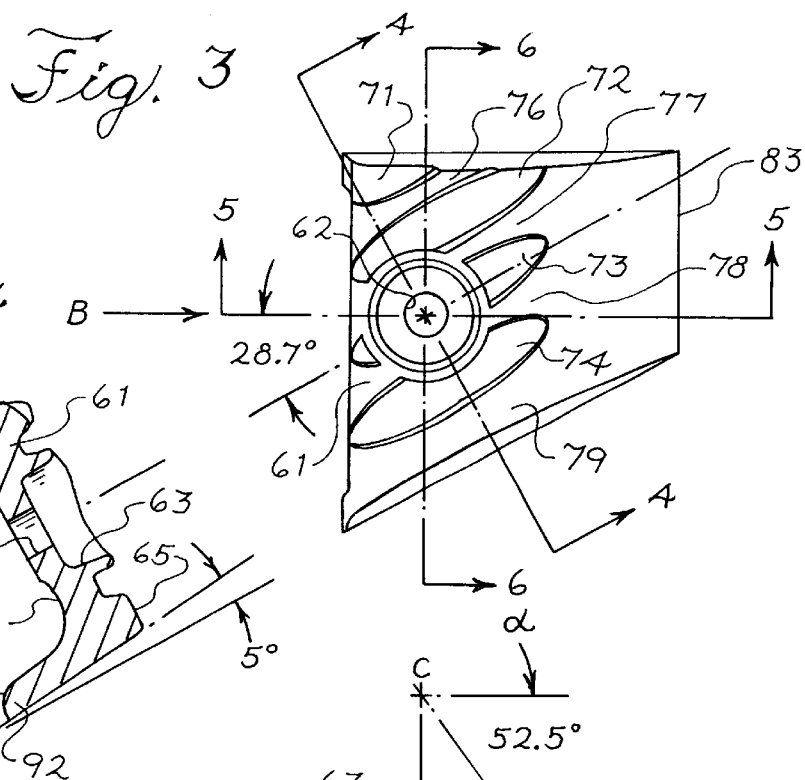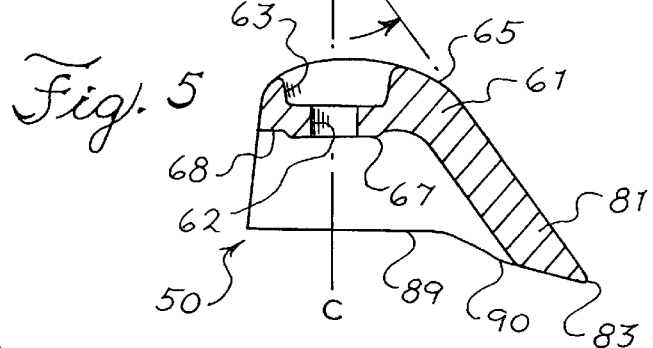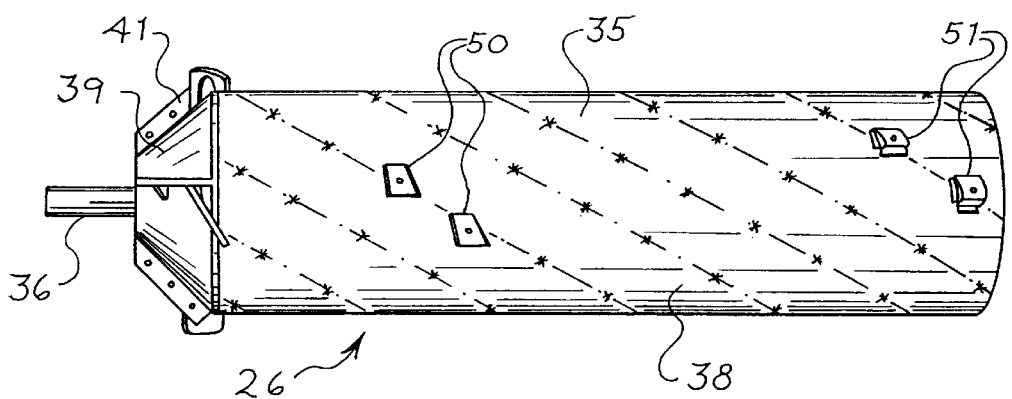

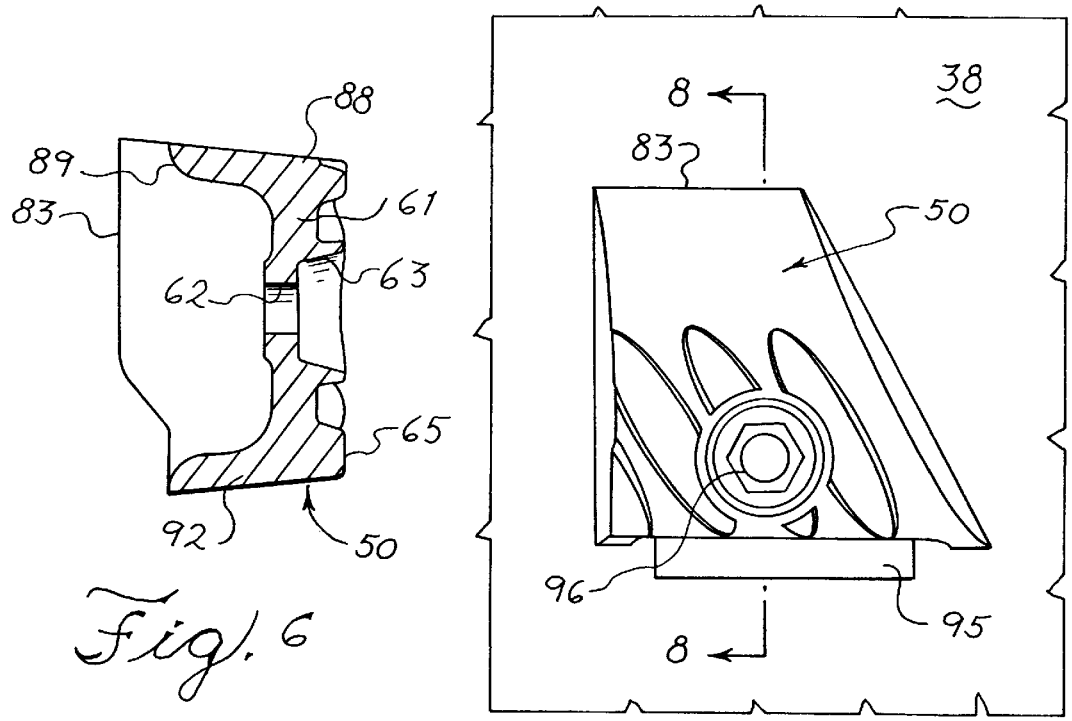
Fig. 6
Fig. 7
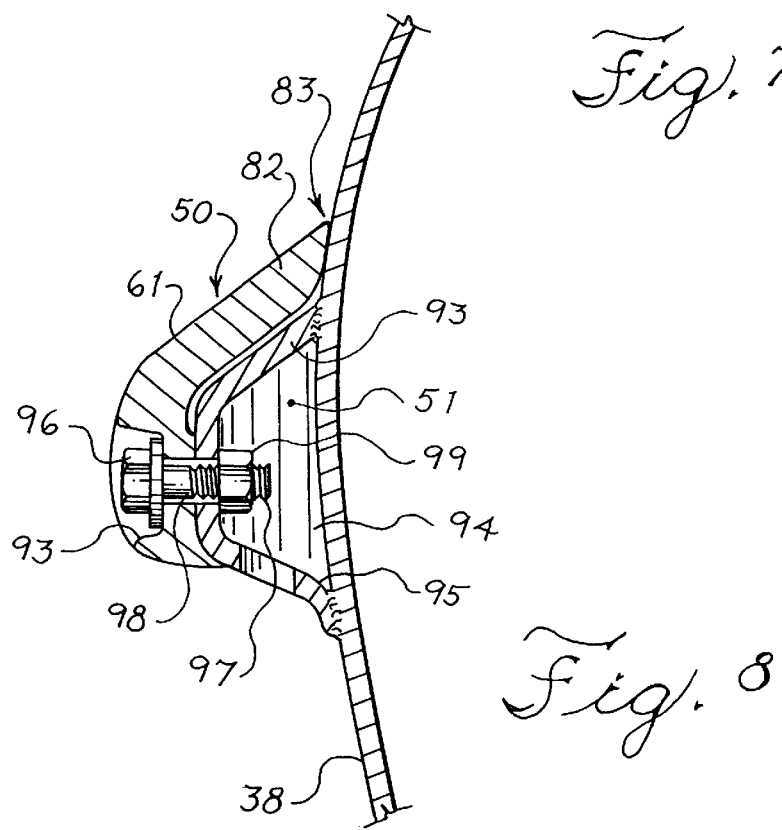
Fig. 8

RASP BAR THRESHING ELEMENT AND ASSEMBLY

FIELD OF THE INVENTION

The invention relates in general to agricultural combines. It relates particularly to the threshing element and rotor assembly in an axial flow combine.

BACKGROUND OF THE INVENTION

In an axial flow combine, threshing takes place between an elongated rotor assembly and a cylindrical housing which encases the rotor assembly. The rotor assembly includes a cylindrical rotor drum having a plurality of threshing elements radiating from it. The threshing elements are mounted on the outer skin of the rotor.

The threshing elements may take the form of rasp bars. Rasp bars are typically arranged in a helical path around the rotor, and are fastened to the outer skin of the rotor on suitably configured brackets. Each bracket is attached to the rotor by welding, for example. Each rasp bar is removably fastened to a corresponding bracket with a fastening bolt.

During threshing, the rotor is rotatably driven at different speeds for different crops and different crop conditions. Crop material received from the combine's header passes between the rotor assembly and the cylindrical housing and is threshed by the action of the rasp bars on the crop material in that confined space. As it does so, the impact of the crop materials on the rasp bars sometimes damages the grain product being harvested. The impact of the axially moving crop material against the rotating rasp bars can abrade the crop material and the grain product, depending upon the type of crop and the rotor speed.

At the same time, the crop material and foreign objects such as pebbles and soil pieces and the like have an abrasive effect on the rasp bars. For example, rice and edible bean crops cause more wear. The rasp bar material normally becomes chipped, pitted and undercut. Uneven wear patterns frequently occur on the rasp bars. This, in turn leads to more crop damage and inefficient threshing.

Chipped, pitted and worn rasp bars may damage the grain product severely. They have to be replaced frequently to minimize damage to the grain product. Whether it is because they frequently cause damage to the grain product, or because the cost of replacing rasp bars is high, presently known rasp bar constructions leave much to be desired.

SUMMARY OF THE INVENTION

It is an object of the present invention to provide an improved threshing element for an axial flow, agricultural combine.

It is another object to provide an improved threshing element comprising a rasp bar made of a chrome-moly white cast iron.

It is still another object to provide a rasp bar made of chrome-moly white cast iron and having an improved shape and threshing surface configuration, as well as improved wear resistance.

It is a further object to provide a rasp bar made of a chrome-moly white cast iron having a chrome content of between 18% and 23% and a shallower face angle than known rasp bars.

It is still a further object to provide a chrome-moly white cast iron rasp bar having a threshing surface with a leading face angle or slope which is approximately 50% less than that of known rasp bars whereby grain product and rasp bar damage is minimized.

It is another object to provide a rasp bar having a leading face slope which is 60° or less.

It is yet another object to provide a rasp bar which has a leading face wall thickness nearly two times that of conventional cast iron bars and affords the rasp bar increased resistance to damage from impact.

The foregoing and other objects are realized in accord with the present invention by providing a rasp bar which is chrome-moly white cast iron. The rasp bar has a wall thickness nearly twice that of conventional cast iron bars. The angle or slope of the leading face on the rasp bar is approximately 50% less than that of any prior art rasp bar configurations. The angle or slope is preferably about 52.5° and, in any event, less than 65° and more than 45°. This configuration results in higher resistance to rasp bar impact damage and, in addition, less crop material damage.

BRIEF DESCRIPTION OF THE DRAWINGS

The invention, including its construction and method operation, is illustrated more or less diagrammatically in the drawings, in which:

FIG. 1 is a side elevational view of an axial flow agricultural combine incorporating a rotor assembly having threshing elements embodying features of the present invention;

FIG. 2 is an enlarged side elevational view of the rotor assembly partially incorporating threshing elements illustrated in FIG. 1;

FIG. 3 is a further enlarged, top plan view of a threshing element embodying features of the present invention;

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 3;

FIG. 7 is a plan view of a threshing element embodying features of the present invention, as attached to the skin of the combine's rotor;

FIG. 8 is a sectional view taken along line 8—8 of FIG. 7;

DETAILED DESCRIPTION OF THE PREFERRED EMBODIMENT

Figure 9:
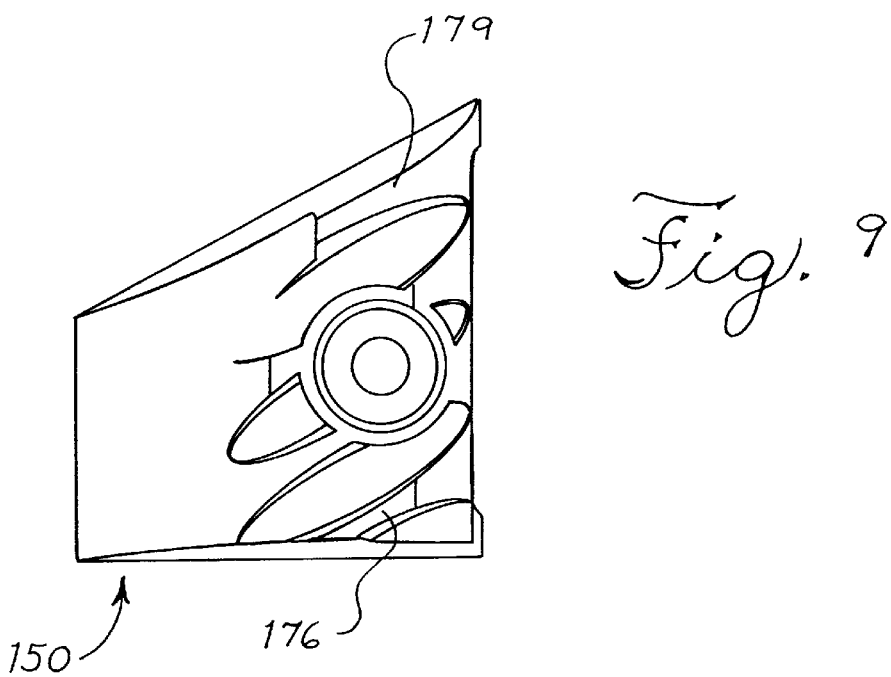
FIG. 9 is a top plan view, similar to FIG. 3, of a modified form of threshing element embodying features of the present invention.

Referring now to the drawings, and particularly to FIG. 1, a self-propelled, axial flow combine is shown generally at 10. The combine 10 includes a body 12 having a longitudinally elongated frame or chassis extending between front wheels 14 and rear wheels 16. A conventional header assembly 18 is mounted on the front of the body 12 and is connected to the body by a feeder assembly 20.

The header assembly 18 cuts and gathers crop material. The feeder assembly 20 feeds the gathered material to a rotary threshing assembly 22 which is inclined upwardly in the combine body 12. The crop material enters the open mouth 23 of the threshing assembly 22 and passes between an axially elongated rotor 26 and a cylindrical housing 28 while the rotor rotates on an axis A. The housing 28, which is stationary, is apertured and has a conventional "concave and grate" construction.

Referring now to FIG. 2, the rotor 26 includes a cylindrical drum 35 mounted for rotation with a shaft 36. The drum 35 has a sheet steel skin 38 formed over an internal frame (not shown) which supports it on the shaft 36. A nose cone 39 having crop directing vanes 41 is disposed on the front of the cylindrical drum 35.

The rotor 26 also includes a series of threshing elements 50 which embody features of the invention. Each threshing element 50 is seated on the skin 38 of the rotor drum 35 over a steel mounting bracket 51, and is fastened to the bracket in a manner hereinafter discussed to form a threshing element assembly. The brackets 51 are welded to the skin 38. In the rotor 26 illustrated here, the brackets 51 are arranged in a helical pattern along the length of the drum 35. For purposes of illustration, a number of the brackets 51 are shown without threshing elements 50.

Referring now to FIGS. 3–6, a threshing element 50 embodying features of the invention is shown independently in some detail. The element 50 is a one piece, cast metal structure commonly referred to as a rasp bar. The rasp bar element 50 is generally dome-shaped and, according to the invention, is cast from a chrome-moly white iron having a chromium content of between 18% and 23%. The alloy which is preferred is similar to ASTM A532 Class II, Type D cast iron with a slightly lower silicon content.

The dome shaped rasp bar element 50 of the present invention is 106.8 mm long from front-to-back, i.e., in the direction B of rotor 26 rotation (see FIG. 3) and perpendicular to the axis A. It is 98.4 mm wide along its trailing edge, which is parallel to the axis A, and 39.9 mm wide along its leading edge, which is also parallel to that axis. The rasp bar element is 66.9 mm high.

The dome-shaped rasp bar element 50 includes a roof section 61 which is pierced by a bolt aperture 62 on an axis C which, when the element 50 is mounted on the drum 35, passes through the axis A of rotation of the drum, i.e., the axis C is a radial of the drum. The bolt aperture 62 is countersunk, at 63, into the upper surface 65 of the roof section 61. An annular mounting land 67 surrounds the aperture 62 on the lower surface 68 of the roof section 61.

The upper surface 65 of the roof section 61 has a series of four elongated grooves cast into it at 71, 72, 73 and 74. The grooves 71–74 are elongated on axes which are inclined at an angle of 28.7° to the direction B of rotation of the rotor 26. The grooves 71–74 are also inclined toward the front end 23 of the threshing assembly 22 in their direction of rotation during operation, as seen in FIG. 2.

The grooves 71–74 define correspondingly oriented rasp teeth 76, 77, 78 and 79 in the upper surface 65 of the roof section 61. The rasp bar elements 50 and these rasp teeth 76–79, in cooperation with the housing 28 in which they rotate, create the threshing action for which the combine 10 is designed. The roof section 61 is 20.2 mm thick from the top of these teeth 76–79 to the bottom of the mounting land 67.

Extending forwardly relative to the direction B of rotor 26 rotation and downwardly toward the rotor axis A is the front wall 81 of the rasp bar element 50. The front wall has a smooth leading face 82 extending between the leading edge 83 of element 50 and the rasp teeth 76–79. The front wall 81 is preferably 15 mm thick between this face 82 and the inner surface 84 of the wall and, in any event, at least 10 mm thick. The face 82 preferably has a slope α of 52.5°, as seen in FIG. 3, and, in any event, a slope α less than 65° and greater than 45°.

Joining the roof section 61 of the rasp bar element 50 to the front wall 81 on the left side of the element (facing in its direction B of rotation) is the left side wall 88 of the element. The left side wall 88 is 15 mm shorter (radially of the drum 35) than the front wall 81 so that its lower edge 89 is displaced upwardly of the leading edge 83 on the front wall. Thus, an inclined offset segment 90 of this lower edge is formed adjacent that leading edge 89. The left side wall 88 extends perpendicular to the axis A of rotation of the drum 35 and is also 15 mm thick.

Joining the roof section 61 of the rasp bar element 50 to the front wall 81 on the right side of the element is the right side wall 92. Like the left side wall 88, the right side wall 92 is 15 mm shorter than the front wall 81 at its leading edge 83. Accordingly, the lower edge 93 of the wall 92 is joined to the leading edge 83 by an offset segment 94 of this lower edge.

Like the left side wall 88, the right side wall is 15 mm thick. Unlike the left side wall 88, however, the right side wall 92 is inclined at an angle of 28.7° to the axis of rotation of the drum 35, parallel to the rasp teeth 76–79. The right side wall 92 and the left side wall 88 thus converge toward the leading edge 83 of the front wall 81.

The rasp bar element 50 does not have a back wall, i.e., the back of the element is open. This permits the element 50 to be mounted on its bracket 51. It affords access to the inside of the element 50 for fastening purposes.

Turning now to FIGS. 7 and 8, a rasp bar element is shown mounted on a bracket 51. The bracket 51 is formed of steel plate in a dome-shaped configuration conforming to the pocket defined by the three walls 81, 88 and 92, and the roof section 61, of the rasp bar element 50. The bracket 51 has a front wall 93, side walls 94 (only one shown) and a back wall 95 welded to the skin 38 of the drum 35.

A hex-head bolt 96 extends through the bolt aperture 62 of the bar element 50 and seats in the countersink 63. The threaded section 97 of the bolt extends through an aperture 98 in the bracket 51. A nut 99 is tightened onto the threaded section 97 through a cut-out formed through the back wall 95 of the bracket 51.

As will be seen in FIG. 8, with the rasp bar element 50 fastened in this manner, its front face 82 engages the skin 38 of the drum 35 at the leading edge 83. The roof section 61 of the rasp bar element 50 is held tightly against the top of the bracket 51.

Figure 10:
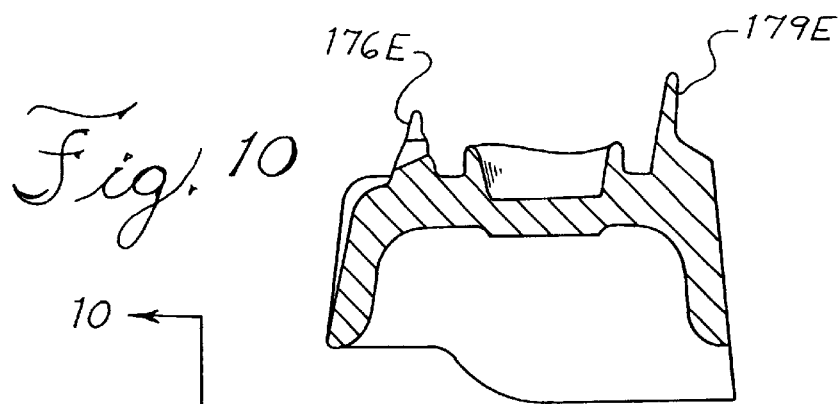
FIG. 10 is a sectional view taken along line 10—10 of FIG. 9.
Figure 11:
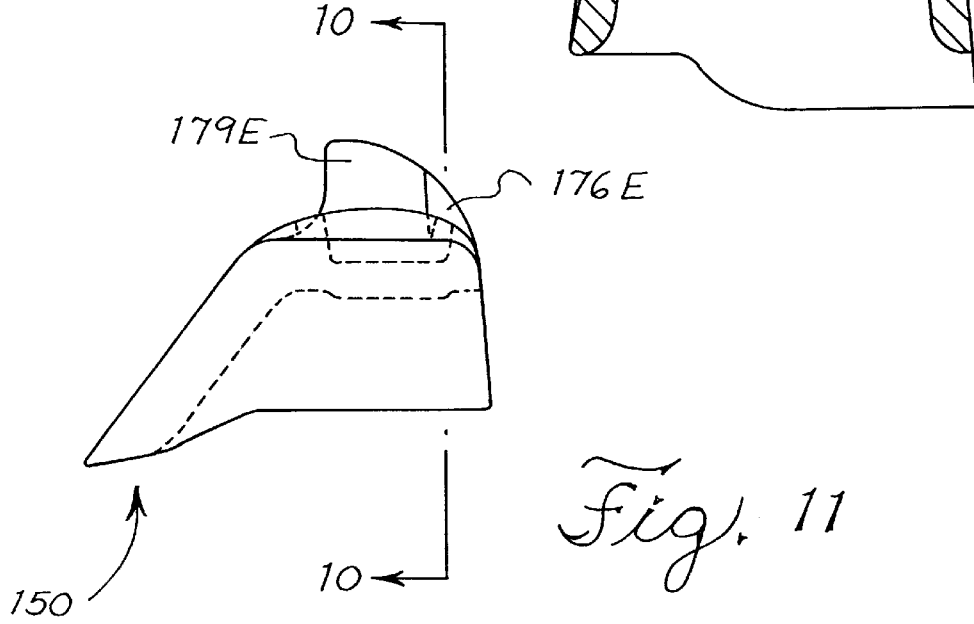
FIG. 11 is a side view of the threshing element illustrated in FIG. 10.

Referring now to FIGS. 9–11, a modified form of rasp bar threshing element embodying features of the invention is illustrated at 150. The element 150 is a "spiked" version of the rasp bar element 50 hereinbefore described and, like conventional spiked rasp bar elements, is designed particularly for use in harvesting rice and viney crops.

The rasp bar element 150 is identical to the element 50 in most respects. As such, corresponding reference numerals plus 100 digits identify corresponding components. The rasp bar element 150 differs only in the configuration of its two outermost rasp teeth 176 and 179. In the rasp bar element 150, these teeth 176, 179 form upwardly extending spikes.

The spikes are defined by vertically elongated extensions 176E and 179E are formed on the teeth. These extensions 176E and 179E are best seen in FIGS. 10 and 11. These extensions improve the threshing action of the rasp bar elements 150 in a known manner where rice or viney crop material is being threshed.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. A threshing element for mounting on a rotating drum in a combine, comprising:
   a) a rasp bar formed from cast iron containing at least 18% chromium;
   b) said rasp bar having a roof section, a downwardly and forwardly inclined front wall and left and right side walls;
   c) a mounting aperture through said roof section defining a radial mounting axis for the rasp bar when it is mounted on the drum; and
   d) said downwardly and forwardly inclined front wall being at least 10 mm thick and having a front face inclined downwardly at a slope of less than 65° from a plane perpendicular to said axis.

2. The threshing element of claim 1 further characterized in that:
   a) said slope of said front face is about 52.5°.

3. The threshing element of claim 1 further characterized in that:
   a) said cast iron is a chromium-moly white cast iron.

4. The threshing element of claim 3 further characterized in that:
   a) said front wall is about 15 mm thick.

5. The threshing element of claim 1 further characterized in that:
   a) said cast iron has a chromium content of between 18% and 23%.

6. A threshing assembly for an axial flow combine, comprising:
   a) a threshing rotor including a drum with a cylindrical skin;
   b) a threshing element mounting bracket fastened to said skin and extending radially outwardly therefrom;
   c) a rasp bar cast from a chromium-moly white cast iron with at least 18% chromium and having a roof section, a front wall and left and right side walls;
   d) said rasp bar being mounted on said bracket whereby a radial of said drum extends approximately perpendicularly through said roof section; and
   e) said front wall being at least 10 mm thick and having a front face inclined downwardly relative to said roof section at a slope of more than 45° and less than 65°.

7. The threshing element assembly of claim 6 further characterized in that:
   a) the slope of said front face is about 52.5°.

8. The threshing element assembly of claim 6 further characterized in that:
   a) the chromium content of said cast iron is 18% to 25%.

9. The threshing element assembly of claim 8 further characterized in that:
   a) said walls are each about 15 mm thick.

10. A threshing element for mounting on a rotating drum in a combine, comprising:
    a) a rasp bar cast from a chromium-moly white cast iron having a chromium content of between 18% and 23%;
    b) said rasp bar having a roof section, a downwardly and forwardly inclined front wall and left and right side walls;
    c) said front wall being 10 mm thick or greater;
    d) a mounting aperture through said roof section defining a radial mounting axis for the rasp bar when it is mounted on the drum;
    e) said downwardly and forwardly inclined front wall having a front face inclined downwardly at a slope of more than 45° and less than 65° from a plane perpendicular to said axis.

11. The threshing element of claim 10 further characterized in that:
    a) said slope of said front face is about 52.5°; and
    b) said front wall is about 15 mm thick.

* * * * *